US008853300B2

(12) United States Patent
Reichenberger et al.

(10) Patent No.: US 8,853,300 B2
(45) Date of Patent: Oct. 7, 2014

(54) MOLDED PLASTIC BODY AND METHOD FOR PRODUCING THE SAME

(75) Inventors: Roland Reichenberger, Regen (DE); Rudolf Paternoster, Rinchnach (DE); Klaus Hock, Regen (DE)

(73) Assignee: Schock GmbH, Regen (DE)

( * ) Notice: Subject to any disclaimer, the term of this patent is extended or adjusted under 35 U.S.C. 154(b) by 1284 days.

(21) Appl. No.: 11/666,224

(22) PCT Filed: Oct. 31, 2005

(86) PCT No.: PCT/EP2005/011627
§ 371 (c)(1),
(2), (4) Date: Apr. 25, 2007

(87) PCT Pub. No.: WO2006/048214
PCT Pub. Date: May 11, 2006

(65) Prior Publication Data
US 2008/0132607 A1    Jun. 5, 2008

(30) Foreign Application Priority Data

Nov. 4, 2004    (DE) .......................... 10 2004 055 365

(51) Int. Cl.
C08K 3/34    (2006.01)
C08J 7/16    (2006.01)
C08J 5/10    (2006.01)
C08J 5/18    (2006.01)

(52) U.S. Cl.
CPC .... *C08J 7/16* (2013.01); *C08J 5/10* (2013.01); *C08J 5/18* (2013.01); *C08J 2333/00* (2013.01)
USPC ................................ 523/216; 524/1; 524/556

(58) Field of Classification Search
CPC ............ C08K 2201/014; C08K 3/0008; C08F 265/06; C08F 2/02
USPC ........................ 428/516; 523/216; 524/556, 1
See application file for complete search history.

(56) References Cited

U.S. PATENT DOCUMENTS 3,827,933 A * 8/1974 Duggins ....................... 428/220
4,791,184 A * 12/1988 Nagai et al. ................ 526/323.2
5,026,429 A * 6/1991 Mronga et al. ................ 106/400
(Continued)

FOREIGN PATENT DOCUMENTS

DE    195 07 875    9/1996
DE    195 21 638    12/1996
(Continued)

OTHER PUBLICATIONS

"Cross-linking" Hawley's Condensed Chemical Dictionary, 14th Edition. 2002.*

*Primary Examiner* — Mark Eashoo
*Assistant Examiner* — Michael A Salvitti
(74) *Attorney, Agent, or Firm* — Roylance, Abrams, Berdo and Goodman LLP

(57) ABSTRACT

A molded plastic body is produced from a cured reaction mixture. The reaction mixture is pourable in a non-cured state and includes 50 to 90% by weight, based on the reaction mixture, of an inorganic particulate filler, a crosslinking agent, and 10 to 50% by weight, based on the reaction mixture, of a binder solution. The binder solution includes a monomer and a polymer dissolved in it. The molded plastic body is characterized in that the percentage of the crosslinking agent admixed with the binder solution is more than 10% by weight based on the percentage of the monomer in the binder solution. The invention also relates to a method for producing the molded plastic body.

25 Claims, 5 Drawing Sheets

(56) References Cited

U.S. PATENT DOCUMENTS 5,218,013 A * 6/1993 Schock .................. 523/209
5,254,599 A * 10/1993 Frank ..................... 521/65
5,464,898 A * 11/1995 Ittmann et al. .......... 524/493
5,690,872 A * 11/1997 Krieg et al. ............. 264/73
5,756,211 A * 5/1998 Ittmann et al. .......... 428/409
5,799,978 A * 9/1998 Grinnell ................. 281/29

FOREIGN PATENT DOCUMENTS

| DE | 199 49 461 | 4/2001 |
| EP | 0 581 225 | 2/1994 |
| EP | 0 659 786 | 6/1995 |
| EP | 1 207 180 | 5/2002 |
| JP | 63068655 | 3/1988 |
| JP | 09067497 | 3/1997 |

* cited by examiner

|  | Formulation 1 | Formulation 2 | Formulation 3 | Formulation 4 | Formulation 5 |
|---|---|---|---|---|---|
| Polymer | 18.38% | 23.12% | 23.11% | 23.12% | 21.90% |
| Methyl methacrylate | 81.62% | 76.88% | 76.89% | 76.88% | 78.10% |
| Filler | Cristobalite flour | Silica sand | Silica sand | Silica sand | Silica sand |
|  | 61.42% | 0.05-0.3 mm | 0.05-0.3 mm | 0.05-0.3 mm | 0.05-0.6 mm |
|  |  | 68.17% | 68.22% | 68.17% | 72.12% |
|  |  |  |  |  | of which |
|  |  |  |  |  | 0.05-0.3 mm |
|  |  |  |  |  | 19.53% natural |
|  |  |  |  |  | 0.1-0.6 mm |
|  |  |  |  |  | 52.59 % black |
| Crosslinking agent | 2.64% | 3.05% | 27.62% | 0% | 2.95% |
| Separating agent | 0.38% | 0.30% | 0.30% | 0.30% | 0.38% |
| Peroxide | 1.96% | 1.90% | 1.86% | 1.86% | 1.86% |
| Pigments | 3.38% | 1.91% | 1.91% | 1.91% | 1.941% |
| Antisettling agent |  | 0.13% | 0.13% | 0.13% |  |

FIG. 4

| | Formulation | HTT [Hot Pot Test] [visual] | WDT [Water vapor test] [visual] | HKZ [Hot/cold cycles] Brightening [visual, DE] | HKZ [Hot/cold cycles] Roughening [haptically] | HKZ [Hot/cold cycles] decorative cracks [UV, visual] | AST [Soiling test] [visual, DE] | TAT 6) [Taber abrasion test] [mg] |
|---|---|---|---|---|---|---|---|---|
| Formulation 1 | Natural color black | Medium strong dulling | DE: 0.29 dull, slightly bright | Slight, spotty DE: 3.2 | None | Fracture at 900 cycles, none | No residue DE: 0.19 darker by polishing action | 19.5 |
| Formulation 2 | Granite single color, color black | Medium strong dulling | DE: 2.7 bright | Spotty, medium DE: 5.60 | None | Slight | Markedly superficially DE: 13.76 | 13.4 |
| Formulation 3 | New surface color black | Not detectable | DE: 0.5 not detectable | Not detectable 0.83 | None | Slight | No residue DE: 0.46 darker by polishing action | 9.0 |
| Formulation 4 | Smooth acrylic surface color black | Strong dulling | DE: 1.91 bright | Spotty, medium DE: 5.61 | Slight-medium | Slight | Markedly superficially DE: 11.24 Brighter by test dirt | 13.8 |
| Formulation 5 | Granite single color standard color black | Slight dulling | DE: 6.85 bright | Medium DE: 9.75 | Medium-strong | Slight-medium | Very strong DE: 13.99 Brighter by test dirt | 9.5 |

FIG. 5

| | Filler | Crosslinking agent in % by weight | Roughness before scratch test | | | Roughness after scratch test | | | Hardness |
|---|---|---|---|---|---|---|---|---|---|
| | | | Rt | Rmax | Rz | Rt | Rmax | Rz | Rockwell E |
| Formulation 2 | Without | 3.05 | 1.6 | 1.3 | 1.0 | 33.9 | 31.6 | 20.7 | 1.0 |
| Formulation 3 | Without | 27.60 | 1.2 | 1.2 | 1.0 | 7.8 | 7.8 | 6.2 | 17.0 |
| Formulation 4 | Without | 0 | 1.5 | 1.4 | 1.1 | 40.0 | 38.3 | 21.9 | -30.0 |
| Formulation 1 | With | 2.64 | 1.2 | 1.2 | 0.8 | 9.5 | 9.5 | 2.7 | |
| Formulation 2 | With | 3.05 | 13.5 | 12.8 | 10.9 | | | | |
| Formulation 3 | With | 27.06 | 2.0 | 1.9 | 1.6 | 2.8 | 2.8 | 1.9 | |
| Formulation 4 | With | 0 | 11.1 | 11.0 | 9.3 | | | | |

FIG. 6

MOLDED PLASTIC BODY AND METHOD FOR PRODUCING THE SAME

FIELD OF THE INVENTION

The invention relates to a molded plastic body according to the preamble of claim 1 and a method for producing a molded plastic body according to the preamble of the independent claim.

BACKGROUND OF THE INVENTION

Generic molded bodies are used for example in the kitchen and bathroom, in particular as sinks, working surfaces, shower trays or the like. In these applications it is especially important that the molded bodies can be easily and thoroughly cleaned, and have high resistance to mechanical and thermal loads and especially to cyclic thermal loads in conjunction with water or water vapor.

DE 38 32 351 A1 discloses molded plastic bodies. Matched to the mass of the monomer in the binder solution, in the prior art a so-called crosslinking agent is added which causes three-dimensional crosslinking of the polymer chains among one another, and thus, increases the hardness and solvent resistance of the molded body which has been produced. The upper limit of the proportion of crosslinking agent is approximately 4% by weight relative to the amount of the monomer.

A higher proportion of the crosslinking agent, depending on the particle size of the inorganic particulate filler, leads to different results which are undesirable. If, for example, the proportion of crosslinking agent is increased when using a filler with a very small particle size, this leads to the molded bodies tearing in the course of shaping polymerization. For coarser fillers conversely an increase of the proportion of crosslinking agent leads to much more visible, in particular white regions on the surface or directly under the surface, with a distribution which is irregular, and the associated molded body does not meet the quality requirements imposed on appearance.

DE 199 49 461 A1 discloses a curable casting mass which contains 2.5% by weight of the crosslinking agent (relative to the monomer content of the binder solution) in the binder solution formed from the monomer (MMA) and polymer (PMMA). In some of the described embodiments another crosslinking agent which is different from the crosslinking agent in the binder solution is not added to the binder solution, but to a dye pigment dispersion. The molded parts produced accordingly do not have the properties which can be achieved by this invention, especially with respect to attainable smoothness of the surface and the outstanding cleanability which can be achieved thereby.

DE 195 21 638 A1 discloses a process for producing highly-filled plastics with a sparkle effect, with a filler suspension with a content of crosslinking monomers given at preferably 0.1 to 5% by weight relative to the monomer content.

JP 09 067497 A and JP 63 068655 A likewise disclose reaction mixtures which contain crosslinking agents which are not castable in the uncured state.

SUMMARY OF THE INVENTION

The object of the invention is to make available a generic molded plastic body and the pertinent production process which overcome the disadvantages of the prior art. In particular the molded body should have good usage properties, especially good care properties and high resistance to mechanical and thermal loads, and high visual quality. The pertinent production process should easily and economically yield molded bodies of high mechanical and visual quality.

This object is achieved by the molded body and by the production process of the present invention. Special embodiments of the invention are defined in the dependent claims.

In a molded plastic body which is produced from a cured reaction mixture, the pourable reaction mixture in the uncured state having an inorganic particulate filler with a portion of 50 to 90% by weight relative to the reaction mixture, a crosslinking agent, and a binder solution with a proportion from 10 to 50% by weight relative to the reaction mixture, the binder solution having a monomer and a polymer dissolved therein, the object is achieved in that the proportion of the crosslinking agent is more than 10% by weight relative to the proportion of the monomer in the binder solution. The molded body is produced preferably in a casting mold.

It is quite surprising that on the basis of an amount of the crosslinking agent of approximately 3% by weight relative to the monomer portion, upon an increase especially the visual properties of the molded bodies produced are first degraded in order to again distinctly improve when the proportion is increased further. Especially for an increase beyond 10% by weight, molded bodies are surprisingly obtained with improved and optimum wear resistance, scratch resistance and ease of cleaning. According to the invention a uniform distribution of small polymer regions is achieved which no longer exhibit the negative properties of spot formation and still adequately stabilize the molded body which has been produced in order to prevent tearing during and after forming. Moreover, a closed surface is formed having distinct advantages over molded bodies from the prior art and a resistant surface with high visual appeal. The surface has improved resistance to falling objects and/or higher scratch resistance, and is also more resistant to hot surfaces.

The attainable usage properties also depend on the grain size of the filler used. Fillers with a grain size less than 0.05 mm can be referred to as fine fillers for many applications. When using these fine fillers the surface is generally smooth and can be especially easily cleaned. However the visibility of scratches is increased, in a hot pot test dulling can occur and the abrasion resistance is less compared to molded bodies with coarser fillers. When using coarser filler there is conversely generally higher resistivity to mechanical and thermal stresses, but brightening in hot/cold cycle test and in the water vapor test can occur, for example under the action of hot water. Moreover, roughened areas can occur in the region of the sink bottom. Ease of cleaning of molded bodies produced in this way is generally less. A combination of fine and coarse fillers do not lead directly to an optimum result.

Both for fine and also coarse fillers however a further improvement of usage properties can be achieved when the proportion of the crosslinking agent is more than 10% by weight, preferably more than 20 and in particular between 20 and 30% by weight, each relative to the proportion of monomer in the binder solution. In other embodiments, the amount of the crosslinking agent is more than 12% by weight, and preferably more than 15% by weight, based on the weight of the monomer. Preferably, a crosslinking agent is used which polymerizes more quickly than the other polymerizable binder solution. In this way an especially hard surface with correspondingly good usage properties is produced. The crosslinking agent is preferably a bifunctional or multifunctional monomer or polymer, in particular a bifunctional or multifunctional acrylate or methacrylate, such as for example ethylene glycol dimethacrylate or trimethylolpropane trimethacrylate. Another possible crosslinking agent is pentaerythritol triacrylate or pentaerythritol tetraacrylate or glycerin dimethacrylate. Research has shown that the crosslinking agent bisphenol-A-ethoxylate(2)dimethacrylate in spite of a proportion of the binder solution which is high according to the invention does not deliver the desired results, so that in one preferred embodiment of the invention this crosslinking agent is not suited. Other crosslinking agents are preferred, in particular trimethylol propane trimethacrylate or one of the aforementioned crosslinking agents. It can also be advantageous to use a combination of two or more such crosslinking agents. The overall designation acrylate can thus comprise both acrylates and also methacrylates.

The proportion of the binder solution is between 10 and 45%, in particular between 15 and 40%, and preferably between 20 and 35% by weight, each relative to the reaction mixture. At these percentages the crosslinking agent with its proportion which is high according to the invention is not attributed to the binder solution. Monomers can be in particular styrene, acrylic acid or methacrylic acid or its esters. In one special embodiment the binder solution has a mixture of methyl methacrylate and polymethyl methacrylate, or a mixture of methyl methacrylate and a polymer, in particular a mixture of methyl methacrylate and a homopolymer or copolymer of methyl methacrylate, the copolymer preferably containing the comonomer ethylmethacrylate or butyl methacrylate.

The ratio of the proportions by weight of the polymer to the monomer in the binder solution is between 1:1 and 1:10, in particular between 1:2 and 1:7 and preferably between 1:3 and 1:5. As a rule, the size of the filler particles used and the required proportion of the binder solution in particular interact with one another such that when the proportion is increased coarser filler particles of the proportion of binder solution tend to be able to be reduced.

The proportion of particulate inorganic filler is preferably between 55 and 85% by weight, in particular between 60 and 80% by weight and preferably between 65 and 75% by weight, each relative to the reaction mixture. In this case it is preferably a mineral inorganic filler, in particular a crystalline filler such as, for example, silica sand.

Preferably the filler particles have a Mohs hardness of more than 5, in particular more than 6 and preferably approximately 7. This applies in any case to the overwhelming proportion of the filler particles used. For technical and economic reasons the use of silicon dioxide with a Mohs hardness of approximately 7 is preferred. Alternatively or in addition also other and in particular harder filler particles can be used which are obtained naturally or synthetically. Examples here include the corresponding glass, silicon carbide, aluminum oxide, or carbon in the diamond modification.

With respect to the hard layer near the surface, due to the high proportion of crosslinking agent comparatively soft fillers with a Mohs hardness of less than 5 are possible, especially those with a Mohs hardness of 3 to 4, such as for example calcium carbonate or the like.

Preferably use is made of naturally obtained silica sands. Especially those silica sands are advantageous which are of high chemical purity, in particular with a low content of iron oxide, and moreover which occur with a very narrow particle size range, for example between 0.05 and 0.3 mm, with a predominant mass proportion between 0.1 mm and 0.2 mm. These silica sands are offered, for example, by the DORFNER company under the trade name GEBA, see http://www.dorfner.de. The reaction mixture cures with unswollen filler particles and in the uncured state cannot be poured, so that all the crosslinking agent which has been added to the binder solution is available for crosslinking of the binder solution.

Preferably the reaction mixture has a substance which prevents settling of filler particles, in particular a thixotroping agent. In this way warping of the polymerized molded body will be prevented. The proportion of the substance which prevents settling of filler particles is less than 1% by weight, relative to the reaction mixture, in particular less than 0.5% by weight, and preferably approximately 0.15% by weight.

In one special embodiment of the invention the reaction mixture has dye pigments. In particular the ease of cleaning of the molded bodies can thus be improved for example in that in the entry areas of public buildings due to the coloring of the molded bodies, dirt is not overly conspicuous. Conversely, in areas with increased hygiene requirements, such as for example hospitals or swimming pools, dirt can be clearly visible due to the coloring of the molded plastic bodies.

The dye pigments can be uniformly or unevenly distributed depending on the application. The dye pigments can also be prepared in a dye pigment dispersion which is later added to the binder solution and mixed with it. In one embodiment of the invention the dye pigment dispersion does not contain any crosslinking agent, but the entire crosslinking agent is added to the binder solution as long as it does not contain any dye pigments or in any event as long as it is not mixed with a dye pigment dispersion. In addition to inorganic dye pigments, organically based dye pigments can be used, and additional filler material can be used in particle form with a size up to a few millimeters which is formed by polymerization with other included inorganic filler particles. Moreover by adding dye pigments it is possible to assign signal effects to the molded plastic bodies. For example molded plastic bodies that are colored as required, such as for example tiles, in commercial areas can mark stop lines, walkways and driveways or the like. A floor area with increased slip resistance can be delineated from a bordering floor area with normal slip resistance in a recognizable manner by the colored plastic bodies.

Preferably the filler particles after polymerization on the surface of the usage side are coated with a closed layer of polymerized mass. This improves especially the cleanability.

Studies of molded plastic bodies produced according to the invention have shown that a high proportion of crosslinking agent in the binder solution does not effect shrinkage of the binder matrix away from casting mold surface, but that rather the casting mold surface is perfectly reproduced by the produced molded body. The surface roughness which can be ascertained on the produced molded body corresponds to the surface roughness of the casting mold surface and can be set exactly, for example by working the casting mold surface in a specific manner in order to prepare the surface topography desired on the molded body. In one embodiment the casting mold surface is provided with a defined surface structure. The casting mold surface is shaped exactly. The differences in contour of the casting mold surface along a curved path and the contour of the molded body along the corresponding curved path are less than 5 µm, in particular less than 2 µm, and preferably less than 1 µm.

The high proportion of the crosslinking agent in the binder solution on the surface of the molded body does not cause the protrusion of filler particles near the surface which is known in the prior art and which is to some extent even required with respect to the desired hardness by the shrinking back of the surrounding binder matrix which leads to a surface topography. The reaction mixture of the invention is tensioned in the cured state over the filler particles near the surface and thus results in the extremely smooth surface. Thus, for example, for the molded bodies according to the invention, on a section between two filler particles near the surface, aside from topographies of the casting mold surface, at the filler content according to the invention, as is described for example in the embodiment of formulation 3 explained below, the maximum "height difference" is less than 5 μm, in particular less than 3 μm and preferably less than 2 μm, in particular less than 1% of the length of the section.

The high degree of crosslinking is also confirmed by the low swelling, especially of the layers of the produced molded body near the surface. Thus, in a swelling test according to accepted practice in polymer chemistry, especially when embedded in methyl methacrylate at atmospheric pressure and room temperature for an interval of 20 hours with the visible side layer of the molded plastic bodies according to the invention only a volumetric increase of less than 10% occurs, relative to the initial volume, while in molded bodies from the prior art the volumetric increase under the same conditions is generally more than 20%. The measurement of the volume increase for highly filled materials, as in this case, yields greater relative increases compared to measurement of the mass increase.

Preferably, glossy particles which induce a metallic gloss in the produced molded bodies are added to the reaction mixture. In this connection in particular glossy particles are used which do not have their own color, but for example due to coatings and the interference which occur thereby cause color phenomena for the viewer. This is associated not only with outstanding visual appearance, but also usage properties are improved. Suitably coated mica flakes are especially preferred with respect to the layer material and/or layer thickness.

The invention also relates to a process for producing a molded plastic body as described above, the process being characterized in that more than 10% by weight of a crosslinking agent relative to the proportion of the monomer in the binder solution are added to the uncured reaction mixture.

Preferably, the mold is filled with the reaction mixture as a dispersion and then the polymerization process is started from the mold part which forms the usage side. Starting takes place conventionally by heating up the pertinent mold part. The reaction mixture is polymerized proceeding from the usage side to the opposite side of the molded body to be produced. Preferably the mold part which forms the usage side is located underneath, but also any other configuration of the mold part which forms the usage side would lead to the effect according to the invention.

By choosing the particle size and the proportion of filler particles in conjunction with the proportion of the bifunctional or multifunctional monomer or polymer, settling of the filler particles caused by gravitation is largely avoided. If necessary, a specific proportion of a substance which prevents settling of the filler particles, in particular a thixotropic agent, is added.

The crosslinking agent is preferable mixed with the binder solution directly and is uniformly distributed in it. Curing of the reaction mixture by polymerization of the binder solution takes place preferably in a mold, and especially in the production of three-dimensional molded bodies it can be a closed mold. Simple two-dimensional molded bodies such as for example tiles or surfaces can also generally be produced in open molds.

Further features and advantages of the invention will be apparent from the following description in which several embodiments of the invention are described in connection with the drawings. The features referred to in the claims and in the specification are essential for the invention individually or in any combination.

BRIEF DESCRIPTION OF THE DRAWINGS

FIG. 4 is a table of the composition of a total of five formulations,
FIG. 5 is a table of the results of the formulations of FIG. 4,
FIG. 6 is a table of the results of the formulations with and without filler.

DETAILED DESCRIPTION OF THE INVENTION

Figure 1:
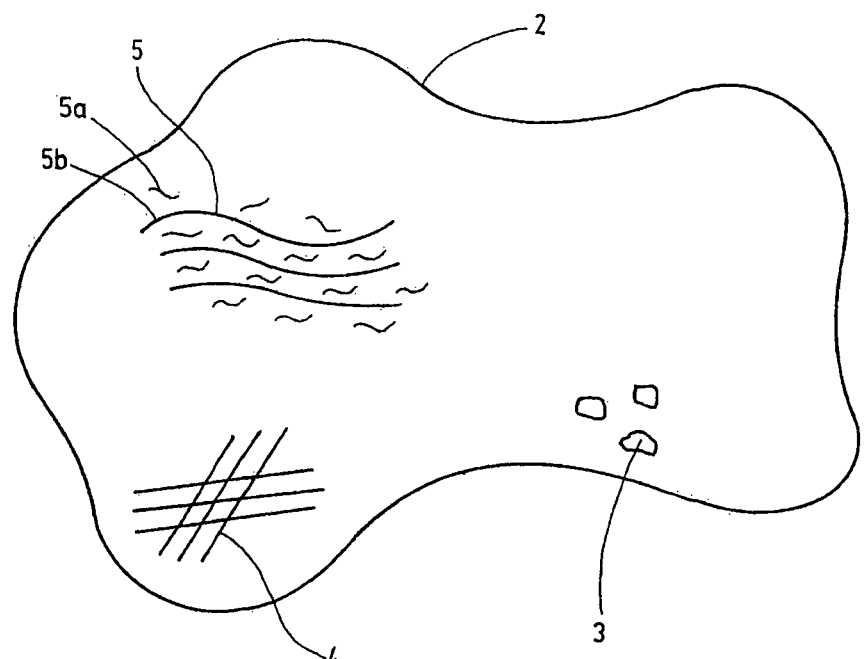
FIG. 1 is a schematic diagram showing the components of the reaction mixture.

FIG. 1 shows schematically some components of the reaction mixture 2, in particular the particulate inorganic filler 3, the crosslinking agent 4 and binder solution 5 which is formed from a so-called syrup with monomer components 5$a$, for example methyl methacrylate, and polymer components 5$b$, for example polymethyl methacrylate. In the uncured state the reaction mixture 2 is of such low viscosity that it is pourable or moldable, in particular can be produced by cast molding of the molded plastic bodies 1 according to the invention (FIG. 3).

Figure 2:
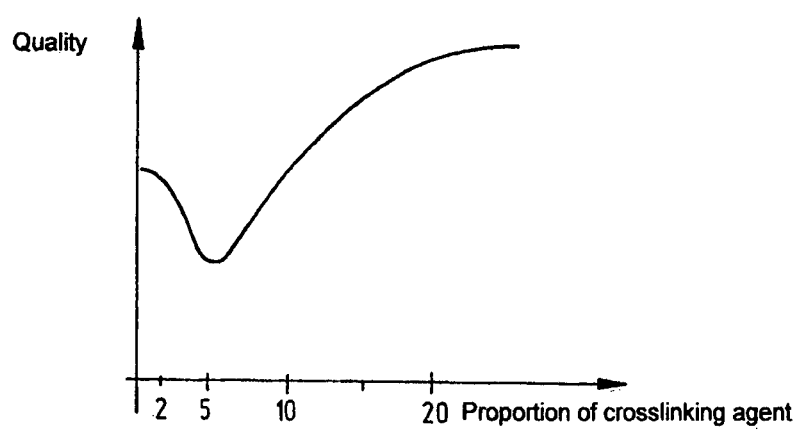
FIG. 2 shows the relationship between the quality of molded plastic bodies and the amount of the crosslinking agent.

FIG. 2 schematically shows the connection of the quality of molded plastic bodies produced according to the invention depending on the proportion of the crosslinking agent 4 in % by weight relative to the proportion of monomer in the binder solution 5. On the basis of a value of 3% by weight which is known from the prior art, in particular the visual quality of the produced molded plastic bodies 1 decreases with an increasing proportion of crosslinking agent and reaches an undesirable minimum at approximately 6% by weight. Surprisingly, as the proportion of the crosslinking agent 4 continues to increase the quality increases again and exceeds the quality of known molded plastic bodies in many applications for values above 10% by weight.

Figure 3:
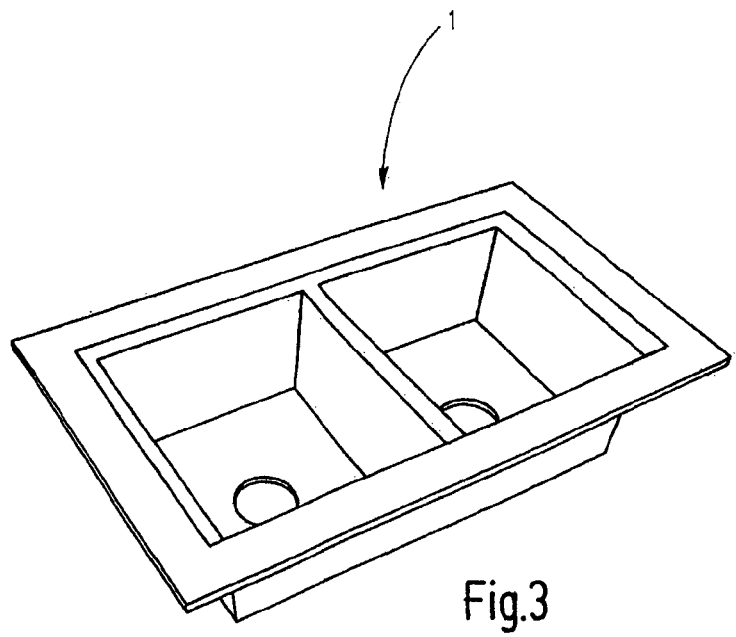
FIG. 3 is a perspective view of a generic molded plastic body.

FIG. 3 shows in perspective a generic molded plastic body 1, in the illustrated case a built-in sink with double sinks. For production purposes closed casting molds are used to which the reaction mixture is added and then is cured by polymerization which is effected by supply of energy. Two-dimensional molded bodies such as for example tiles or surfaces basically can be produced analogously.

FIG. 4 shows in table form the composition of five formulations, of which formulation 3 is according to the invention.

Unless otherwise indicated, all percentages are percentages by weight relative to the reaction mixture. The proportions of polymer and monomer (methyl methacrylate) together yield 100% of the binder solution which has an approximately 30% proportion of the reaction mixture for the five formulations. The proportion of the binder solution from polymethyl methacrylate and methyl methacrylate in the total reaction mixture in formulation (1) is 33.61%, in formulation (2) 28.61%, in formulation (3) 24.18%, in formulation (4) 29.28% and in formulation (5) 24.91%. The information pertaining to the crosslinking agent and peroxides relates conversely as percent by weight to the proportion of monomer in the binder solution which is formed from the polymer and methyl methacrylate. The information pertaining to the separating agent relates as percent by weight to the binder solution.

In formulation 1 the filler is cristobalite flour with a proportion of 61.42% and crosslinking agent proportion of 2.64%.

In formulation 2 the filler is natural colored silica sand with a particle size from 0.05 to 0.3 mm, as sold by the DORFNER company under the trade name GEBA, with a proportion of 68.17% and a crosslinking agent proportion of 3.05%.

In formulation 3 the filler is natural colored silica sand with a particle size from 0.05 to 0.3 mm, as sold by the DORFNER company under the trade name GEBA with a proportion of 68.22% and a crosslinking agent proportion of 27.62%.

In formulation 4 the filler is natural colored silica sand with a particle size from 0.05 to 0.3 mm, as sold by the DORFNER company under the trade name GEBA with a proportion of 68.17%. In formulation 4 no crosslinking agent is used.

In formulation 5 the filler is composed of two different silica sands, specifically of a black-coated silica sand with a particle size between 0.1 and 0.6 mm with a proportion of 52.592% and of a natural colored silica sand with a particle size from 0.05 to 0.3 mm, as sold by the DORFNER company under the trade name GEBA with a proportion of 19.526% and a crosslinking agent proportion of 2.95%.

Formulations 2, 3, and 4 have the same filler, GEBA, with an essentially identical proportion by weight of approximately 68%, formulation 2 having the conventional proportion of crosslinking agent, formulation 3 the proportion of crosslinking agent according to the invention and formulation 4 having no crosslinking agent in order to obtain comparison values for the results which can be achieved with formulation 3 according to the invention. Aside from the filler, formulations 2 and 5 are similar, in order to obtained comparison values for different fillers at conventional proportions of crosslinking agents.

The reaction mixture 2, besides the binder solution 5 which for its part has monomer portions 5a, in particular methyl methacrylate, and polymer portions 5b, and the filler 3, consists of a series of loading materials, including the crosslinking agent 4, a so-called internal separating agent for improved release of the cured molded body from the mold, pigments for coloring, antisettling agents for homogenization of the fillers in the reaction mixture to be cured and peroxides for uniform controlled starting of polymerization. In this connection, except for the pigments and the antisettling agents, the loading materials are added to the binder solution. The percentages for the crosslinking agent and the peroxides in the aforementioned formulations relate to the monomer.

FIG. 5 shows in table form the results of the formulations of FIG. 4 with respect to important usage properties.

This clearly indicates that formulation 3 according to the invention optimally combines the positive properties of formulations 1 and 2 with one another. The hot pot test (HTT) based on standard EN 13310 upon visual inspection does not show any detectable damage. The corresponding applies to the water vapor test (WDT) based on standard EN 13310.

In the hot/cold cycle test based on standard EN 13310 there is no visible brightening and no perceptible roughening. Decorative cracks as a result of hot/cold cycles (HKZ) at the most appear slightly. The soiling test (AST) does not reveal any dirt residue; this confirms the good result relating to roughening after the hot/cold cycle test. The DE value of 0.46 corresponds to an only very slight color change. Finally the Taber abrasion test (TAT) according to DIN 53799 [DIN— German Industrial Standard] also yields a very low, and thus, good value; the level of the numerical value corresponds to the weight loss by abrasion per 100 revolutions.

Formulation 1 yields a single-color black molded body with a smooth surface. Formulation 2 yields a molded body with a granite appearance with a black ground shade. Formulation 3 yields a molded body with a novel surface in the color black. Formulation 3 yields a molded body with a smooth acrylic surface in the color black. Formulation 5 yields a molded body with granite appearance with a surface in the color black.

One special feature of the molded body according to the invention is that the surface is very hard, and thus, has high scratch resistance. Moreover, especially smooth surfaces are formed, particularly when using fillers with an average and great grain size.

FIG. 6 shows in table form other results of the formulations of FIG. 4, this time relating to roughness before and after a scratch test and the Rockwell hardness. For hardness measurements sample pieces were produced without fillers, so that the hardness measurements are not adulterated by filler particles, but actually the hardness of the polymerized surface layer is determined. The hardness measurements were taken by means of a hardness measuring device ASTM 785-03 of ASTM International, 100 Barr Harbor Drive, in West Conshohocken, Pa. 19428-2959, USA. Here the Rockwell scale "E" was used which employs an indenter body ball with a diameter of 3.175 mm at a preliminary force of 10 kg and a main force of 100 kg. The measurements were taken according to a so-called "Procedure A" as is stated in the instruction "Standard Test Method for Rockwell Hardness of Plastics and Electrical Insulating Materials" of ASTM International for D-785-03.

As a result of the hardness test, for formulation 3 according to the invention a very good value of 17.0 arises, conversely for formulation 2 with a proportion of crosslinking agent of 3.05% by weight the value is 1.0, and the sample piece according to formulation 4 without a proportion of the crosslinking agent with −30.0 has the lowest value. Within the framework of these tests the crosslinking agent was trimethylolpropane trimethacrylate (TRIM).

FIG. 6 furthermore shows results of roughness measurements for determining the smoothness of the surface. For the measured parameters surface roughness Rt, maximum surface roughness Rmax and averaged surface roughness Rz, it holds that the measured values are smaller, the smoother the surface. The surface roughness Rt arises from the difference of a local maximum to a local minimum of a section of definable length of the measured sections. There are no standardized measurement conditions for this characteristic. The determination of the averaged surface roughness Rz and the maximum surface roughness Rmax was conversely carried out according to DIN 4768 or DIN EN ISO 11562, edition: 1998-09. The averaged surface roughness Rz is determined by averaging over five individual surface roughnesses so that the effect of outliers on the measured value is reduced. The maximum surface roughness Rmax is the greatest individual surface roughness within the overall measured distance, with a length which can be defined.

The roughness was measured after producing the sample piece as "roughness before the scratch test". Then for sample pieces of formulations 2, 3 and 4 without a filler and in sample pieces of formulations 1 and 3 with a filler a scratch test was run, the pertinent scratching device corresponding to DIN 53799 T10 or DIN 13310, and the scratching diamond having a 90° conical ground surface with 90 μm edge diameter. In the sample pieces of formulations 2, 3 and 4 without fillers there was minor roughness, as expected, before the scratching test. This smooth surface is however greatly roughened by the scratch test for formulations 2 and 4 with a conventional proportion of crosslinking agent or without crosslinking agents, as follows from the high numerical values for parameters Rt, Rmax and Rz of more than 20. Conversely, the sample piece according to formulation 3 according to the invention shows only relatively little roughening by the scratching test with measured values for Rt, Rmax and Rz of under 10 each.

A corresponding result is also shown by the sample pieces of formulations 1 and 3 with fillers. Here for the sample piece of formulation 1 before the scratch test even smaller measured values for roughness arise, only because in formulation 1 a much finer filler is used, see FIG. 4. Formulation 3 according to the invention before the scratch test likewise yields very smooth surfaces with results for Rt, Rmax and Rz of a maximum 2, conversely formulations 2 and 4 which are comparable with respect to the filler used with a conventional proportion of crosslinking agent or without a portion of crosslinking agent have much higher roughness values of approximately 10 or more, for which reason a comparable scratch test could no longer be conducted, and accordingly in FIG. 6 with respect to formulations 2 and 4 no measurement results for roughness after the scratch test are listed.

It is striking here that proceeding from formulation 4 (no crosslinking agent) when the proportion of the crosslinking agent increases (formulation 2), the roughness first increases. It is quite surprising that as the proportion of the crosslinking agent continues to increase (formulation 3), the roughness all at once decreases drastically, and thus, much smoother surfaces are formed. This result corresponds to that behavior of the quality shown schematically in FIG. 2 over the proportion of the crosslinking agent.

Formulation 3 according to the invention after the scratch test also shows low roughness values of less than 3, conversely the comparison formulation 1 has much greater roughness in spite of the much finer filler used there.

Figure 7A:
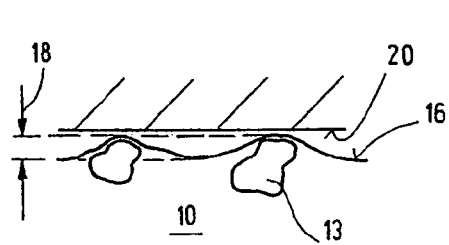
FIGS. 7A and 7B depict the surface of the molded body.
Figure 7B:
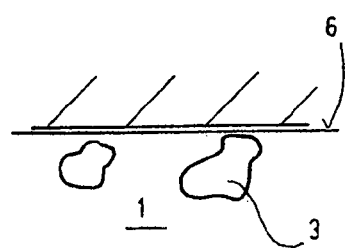

FIGS. 7a and 7b show the topography of the molded bodies which have been produced in cross section, FIG. 7a for a molded body 10 according to the prior art and FIG. 7b for a molded body 1 according to the invention. For the known molded body 10 shrinkage of the surface 16 of the molded body 10 away from the casting mold surface 20, as a result of shrinkage of the binder matrix, and thus, molding of the filler particles 13 to the surface of the molded body 10, and for this reason protrusion of the filler particles 13, occur. A topography forms on the surface 16 which is not decisively determined by the casting mold surface 20 and which is dependent on the size of the filler particles 13 and the distance of two adjacent filler particles 13. For fillers on the order of 100 and 200 μm the maximum height difference 18 on the section between the two adjacent filler particles 13 can be up to 13 μm or up to 7% of the distance between the adjacent filler particles. For otherwise identical molded bodies 1 according to the invention which however have a high proportion of the crosslinking agent (FIG. 7b), this maximum height difference 18 on the distance between two adjacent filler particles 4 is less than 2 μm or less than 1% of the distance between the adjacent filler particles; this results in perfect reproduction of the casting mold surface 20.

While various embodiments have been disclosed to describe the invention, it will be understood that various changes and modifications can be made without departing from the scope of the invention as defined in the appended claims.

The invention claimed is:

1. A cured, molded plastic body produced from a moldable reaction mixture, the moldable reaction mixture comprising:
   about 50% to 90% by weight of an inorganic particulate filler based on the total weight of the reaction mixture; and
   about 10% to 50% by weight of a polymerizable binder solution based on the total weight of the reaction mixture, the binder solution including a monomer, a polymer and a crosslinking agent, the crosslinking agent being present in an amount of more than 20% by weight relative to the weight of the monomer;
   the reaction mixture being pourable in an uncured state; and
   at least one surface of the molded plastic body having the particulate filler particles being coated with the polymerized binder and the molded plastic body having a continuous outer layer of the polymerized binder.

2. The molded plastic body according to claim 1, wherein the crosslinking agent is present in an amount of 20% to 30% by weight based on the weight of the monomer.

3. The molded plastic body according to claim 1, wherein the crosslinking agent is a bifunctional or multifunctional acrylate or polyacrylate.

4. The molded plastic body according to claim 3, wherein the crosslinking agent is selected from the group consisting of ethylene glycol dimethacrylate, trimethylolpropane trimethacrylate, and butanediol dimethacrylate.

5. The molded plastic body according to claim 1, wherein the crosslinking agent polymerizes more quickly than the polymerizable binder solution.

6. The molded plastic body according to claim 1, wherein the crosslinking agent is a combination of two or more bifunctional or multifunctional monomers or polymers.

7. The molded plastic body according to claim 1, wherein the crosslinking agent is uniformly distributed in the binder solution.

8. The molded plastic body according to claim 1, wherein the binder is 10 to 45% by weight based on the weight of the reaction mixture.

9. The molded plastic body according to claim 1, wherein the binder is included in an amount of 20% to 35% by weight based on the weight of the reaction mixture.

10. The molded plastic body according to claim 1, wherein the ratio by weight of the polymer to the monomer in the binder solution is between 1:1 and 1:10.

11. The molded plastic body according to claim 1, wherein the ratio by weight of the polymer to the monomer in the binder solution is between 1:3 and 1:5.

12. The molded plastic body according to claim 1, wherein the binder solution includes a mixture of methyl methacrylate and polymethyl methacrylate.

13. The molded plastic body according to claim 1, wherein the particulate inorganic filler is included in an amount of 55 to 85% by weight, relative to the weight of the reaction mixture.

14. The molded plastic body according to claim 1, wherein the particulate inorganic filler is included in an amount of 65% to 75% by weight based on the weight of the reaction mixture.

15. The molded plastic body according to claim 1, wherein the particulate inorganic filler is a crystalline material.

16. The molded plastic body according to claim 1, wherein more than 90% by weight of the particulate inorganic filler, relative to the entire filler, has a grain size between 0.05 and 2 mm.

17. The molded plastic body according to claim 1, wherein more than 90% by weight of the particulate inorganic filler has a grain size between 0.05 and 0.3 mm.

18. The molded plastic body according to claim 1, wherein the reaction mixture includes dispersed silicic acid.

19. The molded plastic body according to claim 1, wherein the reaction mixture includes a pigment.

20. The molded plastic body according to claim 1, wherein the reaction mixture includes glossy, colorless coated mica particles.

21. The molded plastic body according to claim 1, wherein the molded body is a sink, a shower tray or bathtub.

22. The molded plastic body according to claim 1, wherein the molded body is a tile.

23. A process for producing a molded plastic body comprising the steps of:
    molding a pourable polymerizable reaction mixture including an inorganic particulate filler in an amount of 50 to 90% by weight relative to the total weight of the reaction mixture, 10 to 50% by weight of a binder solution relative to the weight of the reaction mixture, the binder solution including a monomer, a polymer, and more than 20% by weight of a crosslinking agent relative to the amount of the monomer in the binder solution, and polymerizing the reaction mixture.

24. The molded plastic body according to claim 1, wherein the crosslinking agent is included in an amount to prevent shrinkage of the binder from a mold surface and obtain an accurate reproduction of the mold surface.

25. The process of claim 23, wherein the crosslinking agent is included in an amount to prevent shrinkage of the binder from a mold surface, and obtain an accurate reproduction of the mold surface.

\* \* \* \* \*